Patented Mar. 2, 1926.

1,575,529

UNITED STATES PATENT OFFICE.

HERMANN BOLLMANN, OF HAMBURG, GERMANY, ASSIGNOR, BY MESNE ASSIGN-
MENTS, TO MARY FULFORD FOSTER, TRUSTEE, OF WASHINGTON, DISTRICT OF
COLUMBIA.

PROCESS OF INCREASING THE DURABILITY OF PURE SALAD OR SWEET OILS.

No Drawing.      Application filed May 28, 1925. Serial No. 33,561.

*To all whom it may concern:*

Be it known that I, HERMANN BOLLMANN, citizen of Germany, residing at Hamburg, Germany, have invented certain new and useful Improvements in Processes of Increasing the Durability of Pure Salad or Sweet Oils, of which the following is a specification.

The present invention relates to an improvement in increasing the durability of pure oils, such as salad oil, sweet oil and the like.

It is well known that oils obtained from oil seeds, by pressing and the like ordinarily contain more or less lecithin. However when the oils are purified by the ordinary refining and deodorizing processes, which are practically always applied to such oils to be used for foods or in food preparations, the lecithin is removed, along with the other impurities in the oil. So far as I am advised all of the methods ordinarily used for refining and deodorizing the said oils remove the lecithin. Accordingly the pure oils heretofore prepared have not contained lecithin as an ingredient, and this statement applies to salad, sweet oil and the oils used in the manufacture of margarine particularly.

It is well known that oils of the class above mentioned, after being highly purified in the most careful manner, are known to acquire a disagreeable rancidity and rancid taste, even after a short time. I have now found that this latter objection can be substantially obliterated by adding to the purified oil, comparatively small quantities of lecithin, and by preference I employ lecithin from the same kind of seed from which the oil or fat is derived. The invention is however not restricted to the use of lecithin obtained from the same kind of seeds as the oil to which it is to be added.

As an example, soy-bean oil purified according to the methods ordinarily used in purifying soy-bean oil for the making of edible oil material therefrom, and a small amount of lecithin, say from 0.05 to 0.1 per cent can be added. The lecithin is well known to be soluble in the oil. A sample of soy-bean oil treated as above described, was allowed to stand for several days in an open bowl, at the end of which time it was found that there was no alteration in its taste whereas oil from the same batch, after purification, but without the addition of the lecithin, was found to have a disagreeable alteration in the taste, due to rancidity, in the same period.

My researches indicate that lecithin prevents the alteration referred to by oxidation, thereby preventing any undesired changes in the taste of the oil.

Further advantages reside in the fact that the nutritive value of the oil is increased, and when using the oil in frying food, the oil becomes brown, and does not squirt or spatter in the ordinary manner.

The addition of lecithin in the manufacture of margarine has heretofore been proposed. In that case it is usual to employ lecithin from egg yolk. The present invention however relates more particularly to the treatment of vegetable oils which are to be used directly for food purposes.

I claim:—

1. A process for improving the durability of liquid vegetable oils of an edible nature, which comprises adding a small quantity of lecithin to the oil directly after purification.

2. An improved process for increasing the durability of liquid vegetable edible oils consisting in subjecting the oil to the purification operation in a well known way, and then adding 0.05 up to .1% of lecithin.

3. Refined vegetable oil containing a small amount of lecithin.

4. Refined vegetable oil containing a small amount of lecithin of the kind normally present in the material from which the said oil is produced.

5. Refined vegetable oil containing about 0.05 to 0.1% of lecithin.

In testimony whereof I affix my signature.

HERMANN BOLLMANN.